2,957,809
// Patented Oct. 25, 1960

2,957,809

INSULINASE

Norman G. Brink, Westfield, and Urban J. Lewis, Scotch Plains, N.J., assignors to Merck & Co., Inc., Rahway, N.J., a corporation of New Jersey No Drawing. Filed Apr. 13, 1959, Ser. No. 805,721

3 Claims. (Cl. 195—66)

This invention relates to enzymes and more particularly to one which will hydrolyze insulin. The invention also involves a process for the production of this insulinase.

Although enzymes which will digest insulin are known in the art, none of these insulinases is particularly selective in its action against insulin. If they hydrolyze insulin they also have a high order of activity against other proteins and they therefore may not be added to a mixture of insulin and other proteins with the intent of selectively attacking the insulin. The enzyme of the present invention has the unexpected property of having a preferential activity against insulin and a low order of activity against other proteins.

The insulinases which are known have been obtained from rat livers whereas the present insulinase is obtained from hog pancreases. The known differences in proteins obtained from different animal species indicates that the present hog pancreas insulinase is not the same as the known rat liver insulinase.

The insulinase of the present invention and its recovery is disclosed in our copending application Serial No. 567,553, filed on February 24, 1956, and entitled Elastase and Its Preparation in Purified Form. The present application is a continuation-in-part of an earlier application, Serial No. 631,404, filed on December 31, 1956, now abandoned, which was filed as a continuation-in-part of said Ser. No. 567,553. This insulinase is associated with the constituent referred to in Examples III and VII of Serial No. 567,553 as the minor, fast moving component of the crystalline product which had an electrophoresis mobility of $-4.8 \times 10^{-5}$ cm.$^2$ sec.$^{-1}$ volt$^{-1}$. Crude insulinase may be recovered by that procedure and in pure form by the procedure hereinafter described.

Suitable starting material for the preparation of the insulinase is either Pancreatin Merck (U.S.P. powder, Merck & Co., Inc., Rahway, N.J.) or Trypsin 1–300 (Nutritional Biochemicals Corp., Cleveland, Ohio). The processes for obtaining the insulinase in purified form are preferably carried out at 5° C. in a cold room but a refrigerated temperature of between 0° C. and 15° C. may be used or if necessary the processes may be performed at room temperature.

USING TRYPSIN 1–300 AS THE SOURCE MATERIAL 100 gm. of the crude pancreatic material known as Trypsin 1–300 is stirred with from 100 to 5000 ml. of a conventional aqueous buffer such as sodium or potassium acetate, or sodium or potassium phosphate and preferably with 500 ml. of sodium acetate. The pH should be in the range of 3.5 to 7.0 and preferably at pH 4.5, ($\Gamma/2=0.1$). Stirring is continued for at least 10 minutes and preferably for a half hour and then centrifuged at from 1000 to 5000 and preferably at 2000 r.p.m. for 15 minutes to 2 hours and preferably 45 minutes.

The supernatant is then separated as by decanting it and saved while the residue is again extracted with a like amount of the buffer used initially. The two supernatants are pooled as they contain the active material and the buffer-insoluble material is discarded.

The active principle in the supernatant extract is then salted out by making the solution from 40–55% (wt./vol.) saturated with the salting out agent and preferably at 45% saturation. For this purpose the commonly used salting out agents such as sodium phosphate, ammonium chloride and preferably solid ammonium sulfate are used. The preparation is allowed to stand for at least 15 minutes but preferably one-half hour. The precipitate is separated as by centrifugation and the liquid is discarded.

The precipitate is washed with a buffer such as the one initially used but which had been saturated by the salt to about the extent formerly employed. Enough of this is used until the supernatant is practically colorless. For example three 150-ml. portions of aqueous acetate buffer which was 45% saturated with ammonium sulfate are used. This washing removes a great deal of colored material. The washed precipitate is then combined with enough slightly alkaline aqueous buffer to dissolve it. A pH of 8.8 is preferred and this may be obtained by various combinations of a buffering acid and a buffering salt. A suitable buffer is a combination of $Na_2CO$—HCl having a pH 8.8 and 400 ml. of it may be used to bring the precipitate into solution. The solution is then dialyzed against running water until it is substantially free of salt. This will ordinarily require about 16 hours.

A white euglobulin precipitate containing the active material is formed during the dialysis and it is separated and removed as by centrifugation and subsequent decanting. The supernatant is discarded. The euglobulins are washed to remove any remaining salt, using salt-free water such as distilled water and for this purpose two washings of 70-ml. portions are used. These euglobulins may be used as such as the insulinase content is sufficiently high. The euglobulins are dried under vacuum but preferably by lyophilization. The dried material is useful as a product to hydrolyze insulin.

If the euglobulins are to be further purified to recover the insulinase, the euglobulins are then suspended in at least 50 ml. of water and preferably 200 ml. of water. To this suspension is gradually added a salting out agent as referred to above until from 30–45% and preferably 35% saturation is reached. The suspension is allowed to stand for at least 15 minutes and until precipitation has ceased if the maximum yield is desired, and it is then separated as by centrifugation and decanting.

The precipitate is washed until the washings are protein free. Ordinarily it will be enough to wash twice with 50-ml. portions of 35% ammonium sulfate aqueous solution. The washed precipitate is dissolved in slightly alkaline buffer. This may require 20 ml. of the carbonate buffer, at pH 8.8, for example. Any insoluble contaminant is separated by usual means and discarded.

To the supernatant is added a saturated solution of the salting out agent, such as ammonium sulfate. This addition is made dropwise until cloudiness and the solution is allowed to stand at least 12 hours and preferably for 24 hours. Crystallization usually occurs during this time. In a number of cases, it is unnecessary to use the salting out agent to induce crystallization from the carbonate buffer solution, since crystals formed spontaneously upon standing. The suspension is centrifuged and the crystals recovered and washed with the salting out solution until the supernatant is protein free. It ordinarily will be sufficient to wash twice with 40-ml. portions of 35% ammonium sulfate solution.

The crystals are recovered in a dried condition, preferably by lyophilization, but drying under reduced pressure is suitable. This crystalline material is useful as a product of the invention as it will readily digest insulin.

The crystalline material contains approximately 80% of elastase which is described and claimed in Serial No. 567,553, and 3–5% of the insulinase of the invention.

A more highly purified insulinase may be obtained from the crystalline product by preparative electrophoresis. The preparative electrophoresis employed to effect separation of the two substances is carried out with an Aminco Portable Electrophoresis Apparatus (65 ml. cell) in a glycine-NaOH buffer, pH=10, $\Gamma/2=0.1$. 700 mgs. of the crystalline material are dissolved in from 65 to 150 and preferably 70 ml. of this buffer. A field strength of 1.4 volts cm.$^{-1}$ for from 12 to 24 and preferably 17 hours is used. At the end of the run, the individual components are removed with a long needle attached to a motor driven syringe.

The slow moving major component, elastase has a mobility of $-0.8 \times 10^{-5}$ cm.$^2$ sec.$^{-1}$ volt$^{-1}$ in this experiment. The minor, fast moving constituent of the crystalline product has associated with it the insulinase of the invention. The fast component shows a corresponding mobility of $-4.8 \times 10^{-5}$ cm.$^2$ sec.$^{-1}$ volt$^{-1}$ and is entirely devoid of elastolytic activity, when assayed at 0.7 mg. per tube.

This purified insulinase can be used to hydrolyze insulin.

Instead of using this electrophoretic procedure to obtain the insulinase, it may be recovered from the crystalline product in pure form by ion exchange chromatography. To do this, the ion-exchange DEAE (diethylamino ethyl) cellulose is prepared by the method of Ellis and Simpson (J. Biol. Chem., 220, 930 (1956)). 15 to 30 gm. of the ion-exchanger is used for every 500 mg. of protein chromatographed. The column size is from 15 to 30 cm. in height and 1.5 to 3.0 cm. in diameter. The column is run in the cold (0–10° C.).

The crystalline product is dissolved in an alkaline buffer of pH 8–10, and of ionic strength of 0.1 or less. Such buffers are $Na_2CO_3$—HCl, glycine-NaOH,

$$Na_2B_4O_7-HCl$$

Solid $Na_2CO_3$, $Na_2B_4O_7$ or a solution of NaOH is used to help bring the crystals into solution.

When the crystals are dissolved, the solution is dialyzed for 18–36 hours against 1–5 liters of the same alkaline buffer used to dissolve the crystals. This dialyzed solution is then applied as such to the top of the chromatography column. When the sample has entered the column, 5–15 ml. of the same alkaline buffer is added to the top of the column. A mixing flask of 100–300 ml. capacity and which is provided with a stirring device, such as a magnetic stirrer, is mounted above the column. Above the mixing flask, a separatory funnel is mounted to act as a reservoir. The mixing flask is filled with the same alkaline buffer used in applying the protein to the column. To the reservoir is added a buffer solution which is made up of the same alkaline buffer that is in the mixing flask plus a neutral salt, such as NaCl, in an amount to make it 0.05–0.15 M in the neutral salt. The mixing flask is connected to the column by an air tight joint as is the reservoir connection to the mixing flask.

Since the system was air-tight, every volume of solution which entered the column from the mixing flask was replaced by an equal volume of fluid from the reservoir. The volume in the mixing flask, therefore, remains constant. This procedure produces an increasing salt-gradient in the fluid that enters the column.

A flow rate of 5–20 ml. per hour is used and 15 min. to 1 hr. fractions are collected. The amount of protein in the effluent is determined by measuring the ultraviolet absorption of the fractions.

In the procedure described elastase is not adsorbed by the ion-exchanger and passes through with the solvent and is collected in the first fractions that come off the column. A small amount of an elastolytically inactive protein immediately follows the elastase peak and is discarded.

The insulinase is adsorbed by the ion-exchanger from the alkaline buffer solution and is not eluted until the neutral salt concentration goes above 0.2 M. Therefore, as soon as 50–300 ml. of alkaline buffer containing 0.05–0.15 M neutral salt has entered the mixing flask, an increasing amount of neutral salt (dissolved in the alkaline buffer) is added to the reservoir. The insulinase is eluted soon after the salt concentration reaches approximately 0.23 M. By this method the insulinase is separated from the associated fast component and is collected as was the elastase. The fast component is eluted first and the insulinase follows soon after.

The fractions that contain the elastase and those that contain the insulinase are pooled separately and either dried, as by lyophilization, or the protein precipitated from solution by a salting-out reagent, such as ammonium sulfate, and the precipitate collected as by centrifugation.

USING PANCREATIN AS THE SOURCE MATERIAL

A 500-gm. quantity of the crude pancreatic material known as pancreatin is stirred with from 1000 to 10,000 ml. of a conventional buffer such as sodium or potassium acetate or sodium or potassium phosphate and preferably 5000 ml. of sodium acetate. The pH should be in the range of 3.5 to 7.0 and preferably at pH 4.5. Stirring is continued for at least ten minutes and preferably for one-half hour. The solid material is then removed, preferably by filtration. If filtration is used, to it may be added first from 25 to 400 gms. of a water washed filter aid, preferably 100 gms. of Super Cel and the mixture is then subjected to filtration. The recovered solid material of the filter cake is discarded.

The filtrate is made from 40 to 55% (wt./vol.) saturated with a salt which is appropriate to salt out the active principle and this is preferable to a 45% saturation. For this purpose the commonly used salting out agents such as sodium phosphate, ammonium chloride and preferably solid ammonium sulfate is used. The preparation is allowed to stand for at least 15 minutes but preferably the precipitate is allowed to form for one-half hour. The precipitate is separated as by filtration, this time without use of a filter aid. At the beginning of the filtration, about 500 ml. of the mixture which is initially passed through the filter should be recycled in order to build up a filter cake which will retain the precipitate. If the amount of precipitate is small, it may be collected by centrifugation instead of by filtration.

After filtration the precipitate is removed from the paper and washed with a buffer such as the one initially used but which had been saturated by the salting out agent to about the extent formerly employed. Enough of this is used until the supernatant is practically colorless. For example, three 200-ml. portions of the acetate buffer saturated to 45% with ammonium sulfate are used. This washing step may be eliminated if the crystalline elastase preparation is not desired. The precipitate is then combined with enough slightly alkaline aqueous buffer or distilled water to dissolve it. This ordinarily will require about 500 ml. of $Na_2CO_3$—HCl buffer, pH 8.8 or about the same volume of distilled water. The solution is then dialyzed against running water until it is substantially free of salt. This will ordinarily require about 16 hours with thin walled dialysis tubing. If heavier walled tubing is used the dialysis may take as long as 100 hrs.

A white euglobulin precipitate containing the active material is formed during dialysis and it is separated and removed as by centrifugation and subsequent decanting. The supernatant is to be discarded. The euglobulins are washed to remove any remaining salt using salt-free water such as distilled water and for this purpose it is washed twice with 100 ml. of distilled water. The washing is not necessary unless the crystalline elastase is desired.

As has previously been mentioned, these euglobulins may be used as such, by drying them, as the insulinase is in a sufficiently pure form. However, if it is desired to carry out further purification the euglobulins are then suspended in at least 50 ml. of water and preferably in 75 ml. of water.

To this suspension is gradually added a salting out agent as referred to above until from 30 to 45% and preferably 35% saturation is reached. The suspension is allowed to stand for at least 15 minutes and until precipitation has ceased, if the maximum yield is desired, and it is then separated as by centrifugation and decanting. The precipitate is washed until the washings are protein free. Ordinarily it will be enough to wash twice with 50 ml. portions of 35% saturated ammonium sulfate aqueous solution.

The washed precipitate is then dissolved in slightly alkaline buffer. This may require 25 ml. of carbonate buffer, pH 8.8 for example. The solution is then dialyzed for at least 4 hours and preferably for 16 hours against water to remove the salt. After dialysis the precipitate is separated and removed as by centrifugation and decanting.

The precipitate is then added to a sufficient quantity of a dilute neutral salt solution such as that of potassium or sodium chloride or potassium or sodium sulfate to dissolve it. This may be in 25 ml. of 1% sodium chloride, for example. The addition of this neutral salt is desirable because it assists in the subsequent fractionation step.

To this solution is added an organic fractionating agent such as acetone, methanol or ethanol to precipitate the inactive material, and for this purpose 95% ethanol may be used. The fractionating agent is added slowly with stirring until the alcohol concentration reaches 8 to 14% (v./v.). With 95% ethanol a concentration of 10% (v./v.) is appropriate.

The precipitate that forms is separated and is removed as by centrifugation and discarded. The supernatant is then brought to 14 to 20% concentration with an additional amount of the fractionation agent and with ethanol this may be a 17% solution. The precipitate is separated as by centrifugation and is dissolved in a slightly alkaline buffer. This may require, for example, 15 ml. of sodium carbonate buffer, pH 8.8. The solution is then dialyzed against the alkaline buffer to remove the alcohol while maintaining the alkalinity of the solution. To the dialyzed solution is then slowly added an aqueous solution of the salting out agent until a slight cloudiness appeared. Thus, the dialyzed solution is made to 15% saturation with solid ammonium sulfate and then a saturated solution of ammonium sulfate is added dropwise until a faint cloudiness is observed. After standing 1 hour a silkiness will be noted in the solution and overnight a heavy crystal growth will take place.

The ethanol or other fractionation agent may be eliminated as well as the preceding addition of a neutral salt. In this event seed crystals are added to the solution of the product of the preceding step and crystallization will then occur in approximately 12 hours. In either case, the resulting crystals are washed and recrystallized as described above.

The crystalline product from pancreatin possesses the same properties as that isolated from Trypsin 1–300 and may be used to hydrolyze insulin. Or, if a purer material is desired, this crystalline product may be subjected to the preparative electrophoresis procedure or to the ion exchange chromatography procedure which is discussed above using Trypsin 1–300 as the source material.

Instead of purifying the euglobulins to obtain crystalline elastase and then isolating the insulinase from the crude crystals by means of electrophoresis or chromatography, the euglobulin material (line 65, col. 4) may be chromatographed as such on DEAE-cellulose in order to obtain the insulinase.

For the chromatography of the euglobulins from 25–70 gm. of DEAE-cellulose per gram of protein is used to prepare the column. The exchanger is first equilibrated with $Na_2CO_3$—HCl buffer, pH 88, $0.1\Gamma/2$, and then packed into a column. The chromatography is carried out in the cold (0–5°).

The euglobulin starting material, dissolved in the same carbonate buffer used to prepare the column, is dialyzed against more of the same buffer for equilibration. After dialysis the sample is added to the column and the carbonate buffer is run through until all the unadsorbed protein has been washed out of the column. 20–25 ml. fractions are collected at a flow rate of approximately 1 ml. per minute. The elution is followed by measurement of the 280 m$\mu$ absorption of the effluent. Once the unadsorbed protein is removed, a step-wise elution is begun. The charges on the proteins in the mixture are different enough to permit this type of elution. Steps of 0.1, 0.2 and 0.3 M NaCl in the pH 8.8 buffer is usually used to progressively elute the proteins from the column. The insulinase is eluted at a NaCl concentration of between 0.2–0.3 M depending on the column load. The fractions comprising each eluted peak are combined, dialyzed against distilled water and lyophilized. The insulinase is usually the last component to be eluted. This must be determined by assay.

The insulinase obtained from the column can be crystallized by the following method. 100–500 mg. of the lyophilized powder is dissolved in a minimum amount of an alkaline buffer and then dialyzed against an acidic buffer of pH 3.5–5. Amorphous material forms during the dialysis but it is not removed. The entire contents of the dialysis bag is transferred to a stoppered tube and placed in the cold (0–5°). After about a week large crystals appear on the upper walls of the tube. This is collected and washed with the same acidic buffer. The specific activity of the crystals is not significantly different from the lyophilized material from the column.

With the exception of the insulinase, all of the proteins that were eluted from the DEAE-cellulose column were essentially inactive in the insulinase assay. However, it was found that if the protein component that was eluted just before the insulinase was combined with the insulinase, a higher assay value was obtained than with either substance alone. Similar results were obtained when trypsin and the same protein component were combined. These results indicate that the component eluted just before the insulinase is the proenzyme or zymogen of the insulinase. Activation of this zymogen with insulinase or trypsin would yield considerable quantities of the active insulinase.

Representative examples are the following:

*Example I*

A. *Trypsin 1–300.*—This process was carried out in a room at 5° C. 100 gm. of Trypsin 1–300 was stirred with 500 ml. of sodium acetate buffer, pH 4.5, $\Gamma/2=0.1$, for one-half hour and then centrifuied at 2000 r.p.m. for 45 minutes. The supernatant was decanted and saved while the residue was again extracted with 500 ml. of acetate buffer. The two supernatants were pooled and the acetate-insoluble material was discarded.

The extract was brought to 45% saturation with solid ammonium sulfate and allowed to stand for one-half hour. The precipitate was removed by centrifugation and washed with three 150-ml. portions of acetate buffer and was 45% saturated with ammonium sulfate. This washing removed a great deal of colored material. The precipitate was then dissolved in 400 ml. of $Na_2CO_3$—HCl buffer, pH 8.8, and the solution dialyzed against running water for 16 hours.

A white euglobulin precipitate formed during the dialysis and was collected by centrifugation. The supernant was discarded. The euglobulins were washed twice with 70-ml. portions of distilled water and after being recovered by centrifugation were dried under reduced pressure. This product may be used in the manner which has been described.

Example II

The process of Example I was carried out but the recovered euglobulins were not dried but were suspended in 200 ml. of water. Solid ammonium sulfate was gradually added to the susupension until 35% saturation was reached. Complete solution of the protein took place after the addition of approximately 1 gm. of ammonium sulfate; the precipitate was allowed to stand overnight and was then centrifuged and washed twice with 100-ml. portions of 35% ammonium sulfate solution. The washed precipitate was dissolved in 20 ml. of carbonate buffer, pH 8.8, and centrifuged to remove any solid contaminant. A saturated solution of ammonium sulfate was added dropwise to cloudiness and the solution was allowed to stand at least 24 hours. Crystallization usually occurred during this time. In a number of cases, it was unnecessary to use ammonium sulfate to induce crystallization from the carbonate buffer solution since crystals formed spontaneously upon standing. The crystals were centrifuged and washed twice with 40-ml. portions of 35% ammonium sulfate solution.

The crystalline material was quite insoluble in water and only slightly soluble in buffers over the range of pH 5 to 9. The product was recrystallized by suspending about 15 mg. in 1 ml. of pH 10 glycinate buffer and adding 0.1 N NaOH dropwise until the material dissolved. The solution was then dialyzed immediately against carbonate buffer, pH 8.8. Crystallization occurred within 12 hours and the crystals showed strong insulinase activity.

Example III

Starting with the crystalline material of Example II, a purer insulinase was obtained by electrophoresis. The preparative electrophoresis employed to effect separation of the two substances was carried out with an Aminco Portable Electrophoresis Apparatus (65 ml. cell) in a glycine-NaOH buffer, pH=10, $\Gamma/2=0.1$. 700 mgs. of the crystalline material were dissolved in 70 ml. of this buffer. A field strength of 1.4 volts cm.$^{-1}$ for 17 hours' was used. At the end of the run, the individual components were removed with a long needle attached to a motor driven syringe.

The slow moving major component, elastase, had a mobility of $-0.8 \times 10^{-5}$ cm.$^2$ sec.$^{-1}$ volt$^{-1}$ in this experiment. The minor, fast moving constituent of the crystalline product, which has the insulinase of the invention, associated with it showed a corresponding mobility of $-4.8 \times 10^{-5}$ cm.$^2$ sec.$^{-1}$ volt$^{-1}$ and was entirely devoid of elastolytic activity, when assayed at 0.7 mg. per tube.

It will be understood that the products obtained at the end of each of the Examples I, II and III, may be used to hydrolyze insulin, as has been explained.

Example IV 500 mg. of the crystalline product obtained in Example II were dissolved in approximately 25 ml. of $$Na_2CO_3\text{—}HCl$$

buffer, pH 8.8, $\Gamma/2=0.1$. 15 mg. of solid $Na_2CO_3$ was added to aid solution of the crystals. The solution was then dialyzed 28 hours against 2000 ml. of the pH 8.8 buffer. After dialysis this solution was applied to the column.

The DEAE cellulose column was prepared with 20 gm. of the ion-exchanger, packed to a height of 22 cm., and a diameter of 2.5 cm. The ion-exchanger was packed using the same pH 8.8 buffer.

A 125 ml. mixing flask provided with a magnetic stirrer was mounted above the column once the protein had been applied, and 5 ml. pH 8.8 buffer placed on the top of the column. The mixing flask was filled with the same pH 8.8 buffer and a separately funnel containing more of the same buffer was attached to the mixing flask. A flow rate of 11 ml./hr. was used and ½ hr. fraction were collected. After 264 ml. of buffer had entered the column, a solution of the $Na_2CO_3$—HCl buffer containing 0.1 M NaCl was added to the reservoir. After 104 ml. of this buffer had entered the mixing flask and column, the reservoir was filled with a solution of the same carbonate buffer containing 0.15 M NaCl. After 143 ml. of this buffer had entered the mixing flask and column, the reservoir was filled with a solution of the same carbonate buffer containing 0.15 M NaCl. After 143 ml. of this buffer had entered the mixing flask and column, the reservoir was filled with carbonate buffer containing 0.2 M NaCl and 88 ml. of this added. Finally the reservoir was filled with carbonate buffer containing 0.25 M NaCl and this was added until the insulinase was eluted.

The protein in the fractions was determined by adsorption at 280 m$\mu$. Activity measurements for elastase and the insulinase were carried out on the pooled fractions. The elastase was contained in fractions 10–20. Pure insulinase was present in fractions 143–156. The protein from these two sets of pooled fractions were precipitated with ammonium sulfate and the precipitate was collected by centrifugation.

A similar but not identical column was run except that the pooled fractions were dried as by lypohilization.

Example V

B. *Pancreatin*.—This process was carried out in a room at 5° C. A 500-gm. quantity of pancreatin was stirred with 5000 ml. of sodium acetate buffer, pH 4.5, for one-half hour. After addition of 100 gm. of washed Super Cel, the mixture was filtered through a 24-cm. Büchner funnel with Whatman No. 7 filter paper. The filter cake was discarded. The filtrate was made to 45% saturation with solid ammonium sulfate and the precipitate allowed to form for one-half hour. The precipitate was removed by filtration, this time without use of Super Cel. About 500 ml. of the mixture was recycled at the beginning in order to build up a filter cake which would retain the precipitate. After filtration the precipitate was removed from the paper and washed 3 times with 200-ml. portions of the acetate buffer saturated to 45% with ammonium sulfate. The washed precipitate was then dissolved in 500 ml. of $Na_2CO_3$—HCl buffer, pH 8.8, and the solution was dialyzed against running water for 16 hours.

The white euglobulin precipitate that formed during dialysis was removed by centrifugation, washed twice with 100 ml. of distilled water, and after being recovered by centrifugation was dried in vacuum. This precipitate may be used as a product because of its insulinase activity.

Example VI

The process of Example V was carried out but the recovered euglobulins were not dried but were suspended in 75 ml. of water. The suspension was brought to 35% saturation with solid ammonium sulfate. The euglobulins dissolved after standing overnight, the resulting precipitate was centrifuged and washed twice with 35% saturated ammonium sulfate solution and dissolved in 25 ml. of carbonate buffer, pH 8.8. The solution was then dialyzed for 16 hours against water to remove the ammonium sulfate. After dialysis the precipitate was removed by centrifugation and dissolved in 25 ml. of 1% sodium chloride. To this solution, 95% ethanol was added slowly with stirring until the alcohol concentration reached 10% (v./v.). The precipitate that formed was removed by centrifugation and discarded. The supernatant was then brought to 17% with additional ethanol. The precipitate was centrifuged, dissolved in 15 ml. of carbonate buffer, pH 8.8, and the solution dialyzed against carbonate buffer to remove the alcohol. The dialyzed solution was made to 15% saturation with solid ammonium sulfate and then a saturated solution of ammonium sulfate was added dropwise until a faint cloudiness was observed. After standing 1 hour a silkiness was noted in the solution and overnight a heavy crystal growth took place.

*Example VII*

The process of Example VI was carried out up to the point of addition of the ethanol fractionation. Instead, seed crystals were added to the solution and in 12 hours it appeared that crystallization was substantially complete. These crystals were the same as the crystals isolated from Trypsin 1-300 as well as those from Example VI and may be used as a product because of its strong insulinase activity.

*Example VIII*

The crystals from either Example VI or VII were subjected to electrophoresis as described in Example III or were subjected to ion exchange chromatography as described in Example IV to obtain pure insulinase.

*Example IX*

The euglobulin precipitate obtained from Example V was used as starting material. Three gms. of the euglobulin material, dissolved in 100-ml. carbonate buffer, pH 8.8, 0.1 Γ/2, was applied to a 90-gm. column of DEAE-cellulose equilibrated with the same carbonate buffer. The column was run in the cold (0°–5°). Twenty-ml. fractions were collected at a flow rate of about 1 ml./min.

The carbonate buffer was run through the column for 186 fractions. At this point 0.1 M NaCl was added to the buffer entering the column. This eluant was used until fraction 328 when the NaCl concentration was increased to 0.2 M. This eluant was employed until fraction 426 at which time the NaCl was further increased to 0.3 M. This eluant was used until fraction 520 when the column was turned off.

Protein peaks were observed in fractions 20–54, 55–152, 246–280, 334–416 and 458–520. The combined fractions for each peak were dialyzed salt-free and lyophilized. The insulinase was found to be present in tubes 458–520. The yield was 260 mg.

*Example X*

Insulinase similar to that obtained in Example IX was used for the crystallization. One hundred fifty mg. of the lyophilized powder was dissolved in 2 ml. of phosphate buffer, pH 8, 0.1 Γ/2, and dialyzed over night against sodium acetate buffer, pH 4, 0.1 Γ/2. Some amorphous protein formed during the dialysis but it was not removed. The entire contents of the dialysis bag was transferred to a stoppered tube and placed in the cold (4°). After a week large crystals appeared on the side of the tube. These were carefully removed and washed with pH 4 buffer.

The following table summarizes the data which indicates that the component eluted from DEAE-cellulose columns just before the insulinase is the zymogen of the insulinase. The usual insulinase assay was used for these experiments.

TABLE I

| Substances tested: | Percent hydrolysis of insulin |
|---|---|
| Zymogen (110 μg.) | 6 |
| Insulinase (11 μg.) | 12 |
| Zymogen (110 μg.)+insulinase (11 μg.) [1] | 39 |
| Zymogen (95 μg.) | 20 |
| Trypsin (10 μg.) | Negligible |
| Zymogen (95 μg.)+trypsin (10 μg.) [2] | 49 |

[1] Mixture was incubated 10 minutes before addition of insulin.
[2] No pre-incubation before insulin addition.

It will be noted that although the process which has been disclosed when pancreatin is used as the source material may include the use of a fractionating agent such as ethanol to obtain further purification, the processes which have been disclosed are substantially identical. It will be understood that the steps which the disclosed processes have in common are essentially the ones which would be utilized in obtaining the insulinase in a pure or relatively pure form.

Furthermore, it is entirely possible to omit the washing steps particularly if a non-crystalline elastase is not to be obtained. Thus, if the products obtained from Examples I and V are sufficiently pure for the intended purpose, it is not vital that the wash with the aqueous mixture of an acidic buffer and a salting out agent be used, nor that the washing of the euglobulins with a salt-free water be utilized. These two washings will, however, be found to be quite valuable in the event that crystalline elastase is desired as the end product.

The essential properties of insulinase are the following:

(1) The enxyme hydrolyzes insulin. Electrophoretic mobilities: $-0.34 \times 10^{-5}$, and $-7.3 \times 10^{-5}$ cm.$^2$ volt$^{-1}$ sec.$^{-1}$ at pH 4.0, and 8.5 respectively.

(2) The isoelectric point is very near pH 4.

(3a) The sedimentation constant is 3.4 S at 20° and pH 8.0 and at a protein concentration of 1%. Excess NaCl was not present.

(3b) A sedimentation constant of 2.7 S was found a pH 4 in the presence of 1% NaCl and a protein concentration of 0.5%.

(3c) A sedimentation constant of 2.6 S was found at pH 8.5 in the presence of 1% NaCl and a protein concentration of 0.5%.

(4) The enzyme is insoluble in ethanol, methanol, carbon tetrachloride, acetone and ether.

(5) The enzyme is soluble in buffers in the pH range of 3–11.

(6) The protein has an ultra-violet absorption band at 278 mμ and an $$E_{1\,cm.}^{1\%} = 13.4$$

(7) The enzyme is not inactivated by dialysis against H$_2$O.

(8) The enzyme is not activated by Mg$^{++}$, Mu$^{++}$, Ca$^{++}$ or citrate ion.

Because of its high selective action against insulin, this insulinase is useful for addition to a protein mixture including insulin to destroy the insulin and thereby simplify the recovery of a remaining enzyme.

What is claimed is:

1. The process of recovering an insulinase which comprises combining crude pancreatic tissue with an aqueous acidic buffer having a pH of 3.5 to 7.0 and separating and discarding the solids, adding a salting out agent to the liquid and separating and discarding the liquid, washing the solids with an aqueous mixture of acidic buffer and a salting out agent, dissolving the solids in an aqueous alkaline buffer of pH 8.8 and dialyzing it to remove the buffer and result in precipitation of euglobulins, separating and recovering the euglobulins, washing the euglobulins with salt free water, recovering and suspending the euglobulins in water, adding a salting out agent and recovering the precipitate, washing the precipitate with additional amounts of salting out agent, adding the washed precipitate to an aqueous alkaline buffer of pH 8.8, discarding the undissolved solids, dissolving the crystals in a buffer of pH 8 to 10, subjecting the solution to electrophoresis, and collecting the fast moving component.

2. The process of recovering an insulinase which comprises combining crude pancreatic tissue with an aqueous acidic buffer having a pH of 3.5 to 7.0 and separating and discarding the solids, adding a salting out agent to the liquid and separating and discarding the liquid, washing the solids with an aqueous mixture of an acidic buffer and a salting out agent, dissolving the solids in an aqueous alkaline buffer of pH 8.8 and dialyzing it to remove the buffer and result in precipitation of euglobulins, separating and recovering the euglobulins, washing the euglobulins with salt free water, recovering and suspending the euglobulins in water, adding a salting out agent and recovering the precipitate, washing the precipitate with additional amounts of a salting out agent, adding the washed precipitate to an aqueous alkaline buffer of pH 8.8, discarding the undissolved solids, dissolving the crystals in an alkaline buffer of pH 8 to 10, contacting the solution with a modified cellulose anion exchange adsorbent, eluting the adsorbent with a neutral salt solution and concentrating the solution.

3. The process of recovering an insulinase which comprises combining crude pancreatic tissue with an aqueous acidic buffer having a pH of 3.5 to 7.0 and separating and discarding the solids, adding a salting out agent to the liquid and separating and discarding the liquid, washing the solids with an aqueous mixture of an acidic buffer and a salting agent, dissolving the solids in an aqueous alkaline buffer of pH 8.8 and dialyzing it to remove the buffer and result in precipitation of euglobulins, separating recovering the euglobulins, washing the euglobulins with salt free water, recovering and suspending the euglobulins in water, adding the washed precipitate to an aqueous alkaline buffer of pH 8.8, discarding the undissolved solids, dissolving the crystals in an alkaline buffer of pH 8 to 10, contacting the solution with a diethylamino ethyl cellulose adsorbent eluting the adsorbent with a neutral salt solution, and adding a protein precipitating agent to precipitate the insulinase.

References Cited in the file of this patent

UNITED STATES PATENTS 2,803,585   Frederiksen _____ Aug. 20, 1957

OTHER REFERENCES

Biochemical Journal, 1954, vol. 59, pp. 465 to 470, Cambridge University Press, American Branch, New York 22, New York.

Journal of The American Chemical Society, 1955, vol. 77, pp. 2027–2028; 1956, vol. 78, pp. 5888 to 5890.

Journal of Biological Chemistry, 1955, vol. 214, pp. 397 to 408, Waverly Press, Baltimore 2, Maryland.